United States Patent
Schuster et al.

(10) Patent No.: US 7,485,365 B2
(45) Date of Patent: Feb. 3, 2009

(54) COPPER-BASED METAL FLAKES, IN PARTICULAR COMPRISING ZINC AND METHOD FOR PRODUCTION THEREOF

(75) Inventors: Thomas Schuster, Lauf (DE); Wolfgang Herzing, Speikern (DE); Rolf Treude, Erndtebruck-Schameder (DE); Stanley Cichanowski, Bennington, VT (US)

(73) Assignee: Eckart GmbH, Furth (DE)

( * ) Notice: Subject to any disclaimer, the term of this patent is extended or adjusted under 35 U.S.C. 154(b) by 115 days.

(21) Appl. No.: 10/525,392

(22) PCT Filed: Aug. 7, 2003

(86) PCT No.: PCT/EP03/08728

§ 371 (c)(1),
(2), (4) Date: Feb. 22, 2005

(87) PCT Pub. No.: WO2004/026971

PCT Pub. Date: Apr. 1, 2004

(65) Prior Publication Data

US 2006/0053968 A1    Mar. 16, 2006

(30) Foreign Application Priority Data

Aug. 20, 2002  (DE) .............................. 102 37 957

(51) Int. Cl.
*B32B 5/16*  (2006.01)

(52) U.S. Cl. ........................ 428/403; 428/404; 428/405; 428/406; 428/407

(58) Field of Classification Search ................. 428/403, 428/404, 405, 406, 407
See application file for complete search history.

(56) References Cited

U.S. PATENT DOCUMENTS 3,941,584 A * 3/1976 Tundermann et al. ....... 428/402
4,321,087 A * 3/1982 Levine et al. ................. 75/356

FOREIGN PATENT DOCUMENTS

| EP | 0499817 A1 | 8/1992 |
| JP | 60229966 | 11/1985 |
| JP | 09165544 | 6/1997 |

OTHER PUBLICATIONS

Pigment Handbook, vol. 1, Second Edition, p. 805, Ed. Peter A. Lewis, John Wiley & Sons.
Osterag et al., "Iron Oxide-Coated Aluminum Pigments", Farbe + Lack, vol. 93, No. 12, pp. 973-976, (1987).
Pfaff et al., "Pearlescent Pigments for Paints and Other Applications", Farbe + Lack, vol. 93, No. 2, pp. 89-93, (1955).
Kienel et al., "Vacuum Coating 2", VDI-Verlag, pp. 21-61, (1995).
Database WPI, Section CH, Week 198601, Derwent Publications Ltd., London, GB, AN 1986-003700, XP002260804 & JP 60 229966 A (Shinetsu Chem Ind. Co. Ltd., Nov. 15, 1985, 1 page, abstract.

* cited by examiner

*Primary Examiner*—Leszek Kiliman
(74) *Attorney, Agent, or Firm*—Browdy and Neimark, P.L.L.C.

(57) ABSTRACT

The present invention relates to highly lustrous gold-colored metal effect pigments comprising a copper-based alloy and additional metallic alloy components, preferably zinc, and which are produced by means of stripping and comminuting metal films deposited in vacuo.

11 Claims, No Drawings

COPPER-BASED METAL FLAKES, IN PARTICULAR COMPRISING ZINC AND METHOD FOR PRODUCTION THEREOF

BACKGROUND OF THE INVENTION

Metallic effect pigments are pigments that exhibit specular reflection on flat, oriented particles (DIN 55944). The interest in lustrous gold-colored effect pigments is great, particularly in the fields of application of printing, lacquer, paint coating, plastic coloring, cosmetics and glass coloring, since the gold-like products have a high aesthetic quality and impart to such coated, imprinted or colored materials an expensive look. Early on it was begun to replace the expensive genuine gold flakes in the decorative field with more cost-effective alternatives.

The best known genuine-gold flake substitute pigments are the so-called gold bronze powders, which consist predominantly of copper/zinc alloys and, depending on their composition, may have different shades of color ranging from red gold to rich gold (Pigment Handbook, Vol. 1, Second Edition, p. 805 ff, Wiley). Gold bronze pigments are produced through atomization of a molten copper/zinc alloy and subsequent grinding of the granules produced by the atomization. During the grinding process, the alloy particles are deformed flake-like and comminuted. In practice, gold bronze pigment is predominantly ground dry. To prevent cold welding, a lubricant, such a stearic acid, is added to the utilized granules. A post-treatment of the ground product by brushing or gentle milling in special ball mills serves to improve the luster of the metal pigment and is referred to as polishing. Irregularities in the surfaces of the metal flakes have a luster-reducing effect. Since the generation of irregularities in the structure of the surfaces of the flakes and different flake thicknesses cannot be avoided during the grinding process, the gold bronze pigments that are produced in this manner do not exhibit the luster that is calculated from the reflectivity of the alloys. Additionally, virtually all gold bronze pigments that are produced via grinding processes display leafing properties, i.e., they float in the medium, which can be attributed to the lubricants added during the grinding process. The manufacture of non-leafing gold bronze pigments requires expensive freeing from lubricant.

Attempts to replace genuine gold flakes via iron-oxide-coated mica pigments (G. Pfaff and R. Maisch, Farbe+Lack, Vol. 2, 1955, p. 89-93) or iron-oxide-coated aluminum pigments (W. Ostertag, N. Mronga and P. Hauser, Farbe+Lack, Vol. 12, 1987, p. 973-976) do not achieve their objective regarding the required brilliance. While it is possible to produce interesting shades of color ranging from red gold to green gold via interference effects, is has been shown that the high luster-determining reflection values of metals cannot be achieved via oxidic planes of reflection.

From U.S. Pat. No. 4,321,087 it is known that metals are deposited onto a carrier sheet and pigments are obtained after stripping and comminuting.

As a method for producing metallized layers, the customary vapor deposition methods (electron beam technology, resistance radiation heated processes) may be used, which are described in detail, for example, in G. Kienel (editor) "Vakuumbeschichtung Vol. 1-5", VDI-Verlag 1995.

In the case of alloys consisting of two or more components, a fractionating occurs due to different vapor pressures. Different evaporation methods (flash evaporation, simultaneous method or jumping beam method) exist whereby homogeneous alloy layers of any desired composition are producible (G. Kienel).

SUMMARY OF THE INVENTION

It is the object of the present invention to develop a lustrous gold-colored, highly brilliant metallic effect pigment with comparable alloy composition as it is possessed by the conventional gold bronze pigments (copper/zinc).

It is a particular object to make available a lustrous gold-colored metallic effect pigment with plane-parallel surfaces and low uniform particle thickness, so that the pigment can be applied in all areas of the graphics industry, particularly also in offset printing.

It is an additional object of the present invention to make available a lustrous gold-colored metallic effect pigment in various shades of color from red gold to green gold.

It is an additional object of the present invention to make the lustrous gold-colored metallic effect pigment available in corrosion-stable form, so that no impairment in the luster and shade of the products occurs in the customary fields of application.

It should additionally be producible at economically supportable costs.

These objects can be met with a one-layered flake-like metal pigment with plane-parallel planes of reflection that is composed of a copper-based alloy deposited by condensation from the vapor phase. A preferred suitable alloy partner is zinc. The coloristics of the novel lustrous gold-colored pigments are determined predominantly by the ratio of copper to zinc. The higher the percentage of copper, the more red gold the flakes are. Typical compositions of flakes with red gold to yellow gold or green gold luster contain, in addition to copper, 2 to 40% zinc and optionally 0.1-6% silicon and/or aluminum. The flake thickness is 10-100 nm, preferably 20-60 nm and can be varied without difficulty. Very thin flakes are partially transparent.

One particular characteristic of the lustrous gold-colored pigments are their perfect plane-parallel surfaces, their undisturbed structural composition and their uniform flake thickness, which permits the highest possible reflection values.

The most important steps of the manufacturing process are, optionally, application of a release coat onto a carrier sheet, condensations of the alloy as a film onto the release coat or carrier sheet, stripping of the metallic film, comminuting of the film, and optionally sizing of the pigment particles. The vaporizing of the metals under vacuum takes place according to known methods using the ready-made alloys or the individual metals. Stripping of the metallic film takes place either by dissolving the release coat or by dissolving the carrier sheet.

The inventive pigments exhibit the highest degree of brilliance and are sufficiently corrosion-stable in many fields of application. If a special corrosion stability is required it is possible to improve the stability of the highly lustrous pigments through surface coating. The surface coatings are generally sufficiently thin and have virtually no impact on the luster behavior of the metal flakes. Surface coatings to improve the corrosion behavior may be applied in the vacuum chamber in the course of the metal film deposition, for example through vacuum deposition of $SiO_x$ on both sides of the metal film, or via wet-chemical methods during or after comminuting of the film. Depending on the requirement, protective coatings of $SiO_2$, $Al_2O_3$, phosphate, phosphoric ester, phosphinic acid, silanes, or combinations of these compounds have proven effective.

DETAILED DESCRIPTION OF THE INVENTION

The lustrous gold-colored metal flakes are used for lacquers, paints, dyes, printer's inks, plastic coloring, cosmetics, glass and ceramics.

The following is an explanation in detail:

The present invention relates to a novel effect pigment composed of a copper/zinc alloy. Surprisingly it is possible to deposit coloristically suitable alloys from the vapor phase in vacuo. Pigments that consist of alloys and are produced by simultaneous condensation of metal vapors have not been known until now.

Suitable alloys for the development of brilliant genuine-gold substitute pigments via PVD processes are copper-based and contain, for example, as additional alloy components, zinc as well as optionally aluminum and/or silver, palladium and silicon.

Coloristically, a wide range between red gold, pale gold and green cold can be created via the composition of the deposited alloy. The color-imparting copper plays the main role in this context. The surfaces of pigments with 95 wt. % copper, for example, have a red gold luster, whereas those with only 70 wt. % copper appear green golden.

Coloristically interesting compositions lie, for example, at 70-98% copper, 30-2% zinc. If very thin flakes are present, they may display partial transparency. Interference effects may have minor impacts on the above-described coloristics.

The thickness of the lustrous gold-colored metal flakes can be adjusted and controlled without difficulty via the evaporation rate of the metals and via the belt speed. For economic reasons, the belt speeds are generally selected between 2 and 5 m/sec. Metal film thicknesses between 10 and 100 nm may be selected in the process, as desired. For the manufacture of lustrous gold-colored metal flakes, thicknesses between 20 and 60 nm are of particular interest. The particle size is adjusted after stripping of the metal films from the carrier sheet, through mechanical comminuting of the film fragments. The comminuting may take place with suitable agitators, pumps, or with the aid of ultrasound units of the film fragments that are suspended in a solvent. Generally, particle sizes between 2 and 150 μm, preferably between 5 and 50 μm are of interest. As with all effect pigments, the optical appearance can be varied by means of sizing, i.e., setting narrow particle size distributions with different mean diameters. The sizing may be performed, for example, in a decanter.

The characteristic properties of the gold-colored metal flakes are their high reflectability and a very high tinctorial power of the pigment in the application. The high reflectability is based on the mirror-smooth undisturbed surfaces and the uniform thickness of the flakes. Potential scatter centers are reduced to a minimum. The high tinctorial power of the pigment is based on the low thickness of the individual particles so that a sufficient degree of coverage can be attained already with a comparably small amount of pigment.

The inventive pigments are produced in such a way that a carrier sheet, for example a PET film or a continuous metal belt is optionally coated with a release coat. The coating of the carrier sheet with a soluble resin or wax may be performed via a dipping or imprinting method.

The appropriate metals are then evaporated individually in evaporators under high vacuum and condensed onto the carrier sheet.

The metal film is subsequently stripped in such a way that either the release coat or the carrier sheet is dissolved and comminuted to pigment particle size in a solvent suitable for the application, such as isopropanol, isopropylacetate, ehtylacetate or glycol ether by means of a suitable agitator or a pump that exerts high shearing forces. Ultrasound comminuting may be used in addition or alternatively. Optionally, the pigment particles are also sized.

To protect the metal surfaces of the inventive pigments from corrosion, it is possible to provide them in an additional step with anticorrosive layers. Since these layers are thin and low refracting, they have virtually no influence on the optical behavior of the pigments. In principle, two methods of applying anticorrosive layers are possible: on one hand by vapor deposition of a double-sided protective layer during the evaporation process, on the other hand by precipitation of a passivating layer during or after comminuting of the film fragments. The vapor deposition of protective layers during the evaporating process is performed in the sequence protective layer, alloy film, protective layer, for which low-soluble but easily evaporated materials are generally selected, such as $SiO_x$ or $MgF_2$. The precipitation of a passivation layer is performed as a wet-chemical reaction. The precipitation of a thin $SiO_2$ layer, expediently via a sol-gel process through hydrolysis of silanes and subsequent silanol treatment has proven suitable, also the precipitation of aluminum oxide, silicon oxide, phosphate, phosphoric acid, phosphoric esters, phosphinic acid, silanes, organically modified silicates, titanates, zirconates or methacrylate-based polymer layers or combinations of these compounds.

The following examples shall serve to explain the invention in more detail.

EXAMPLE 1

In a roll coater by firm Steiner GmbH & Co. KG, a PET carrier film of 24 μm thickness, which is coated with a release coat, is coated with a copper/zinc alloy under high vacuum. The release coat consists of acetone-soluble methylmethacrylate resin and is printed on in advance in a separate processing step. The vacuum is adjusted to $5.10^{-4}$ mbar.

The speed with which the length of carrier sheet is unwound is 3 m/s. Copper and zinc are evaporated in separate evaporators at a rate that results in a metal film thickness of 40 nm on the moving carrier sheet. After completion of the coating the roll coater is flooded with nitrogen, the metallized PET roll is stripped and treated with acetone in a stripping station. Through dissolving of the release coat the metal film is separated from the carrier sheet. The metallic film fragments are concentrated in a centrifuge and separated from the release-coat containing acetone solution. The filter cake is then entered into an isopropanol solution, where the film is comminuted over the course of 20 minutes. The metal flakes are present in a 12% suspension.

The obtained pigment suspension exhibits lustrous gold-colored pigment particles of the highest brilliance. The mean particle size of the flakes is 10 μm (Cilas). Chemical analyses show that the pigment contains 70% copper and 30% zinc. X-ray analyses reveal that the elements are present in homogenous alloy form.

Stabilization:

1000 g of the above produced 12% pigment suspension in isopropanol are heated to the boiling point and 11 g tetraethoxysilane and 10 g water are added. A 10% aqueous solution DMEA is subsequently added using a Dosimat until a pH of 8 is reached. The mixture is stirred for 2 hours while maintaining the pH.

1.4 g diphenyl dimethoxysilane, which is dissolved in 12 g isopropanol, is then evenly dosed in over 4 hours while stirring. Subsequently, 0.5 g 3-aminopropyltrimethoxysilane (Dynasilan AMMO) are added and the mixture is cooled over the course of 10 hours while stirring.

The metal pigment is then present in a corrosion-stabilized form.

The invention claimed is:

1. Lustrous copper-based metal flakes that contain, in addition to 70-98 wt % copper, at least one additional metallic alloy component comprising 2% to up to 30 wt % zinc and are produced via vacuum evaporating of the separate components and wherein each component of the alloy is evaporated separately, deposition of alloy metal films onto a carrier sheet, stripping of the films from the carrier sheet and subsequent comminuting of the films wherein the flakes have plane-parallel surfaces and a thickness of between 20 and 60 nm.

2. Lustrous copper-based metal flakes according to claim 1, characterized in that the flakes contain silicon as an additional alloy component.

3. Lustrous copper-based metal flakes according to claim 1, characterized in that the flake-shaped effect pigment has a thickness between 10 and 100 nm.

4. Lustrous, copper-based metal flakes according to claim 1, characterized in that the surface of the pigment particles is coated with an anticorrosive layer.

5. Lustrous copper-based metal flakes according to claim 4, characterized in that the anticorrosive layer contains aluminum oxide, silicon oxide, phosphate, phosphoric acid, phosphoric ester, phosphinic acid, silanes, organically modified silicates, titanates, zirconates or methacrylate-based polymer layers or combinations of these compounds.

6. A method for producing lustrous, copper-based metal flakes according to claim 1 wherein in the at least one additional alloy component is zinc with the following process steps:
   a) optionally applying a release coat on a carrier sheet;
   b) applying of a metal film onto the release coat or the carrier sheet;
   c) stripping of the metal film; and
   d) comminuting to pigment particles.

7. A method for producing lustrous copper-based metal flakes according to claim 1 with the following process steps:
   a) applying of a metal film onto a carrier sheet;
   b) dissolving of the carrier sheet; and
   c) comminuting of the metal film to pigment particles.

8. A method according to claim 6, characterized in that applying of the metal film takes place by separate evaporation of the alloy components.

9. A method according to claim 6, characterized in that applying of the metal film takes place through separate evaporation of an alloy and one or more additional components.

10. A method according to claim 6, characterized in that applying of the metal film takes place through electron beam, resistance heating, or radiation heating.

11. A method according to claim 6, characterized in that applying of the metal film takes places through flash evaporation, simultaneous evaporation, or jumping beam evaporation.

* * * * *